Sept. 4, 1928.  1,683,503
E. A. P. VAN LITH
HEADLIGHT CLOSURE FOR MOTOR VEHICLES
Original Filed Dec. 13, 1926
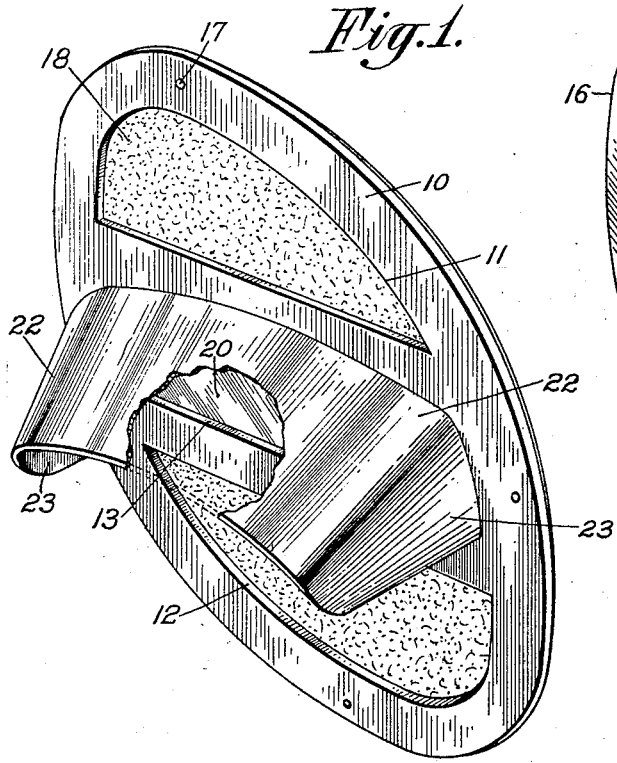
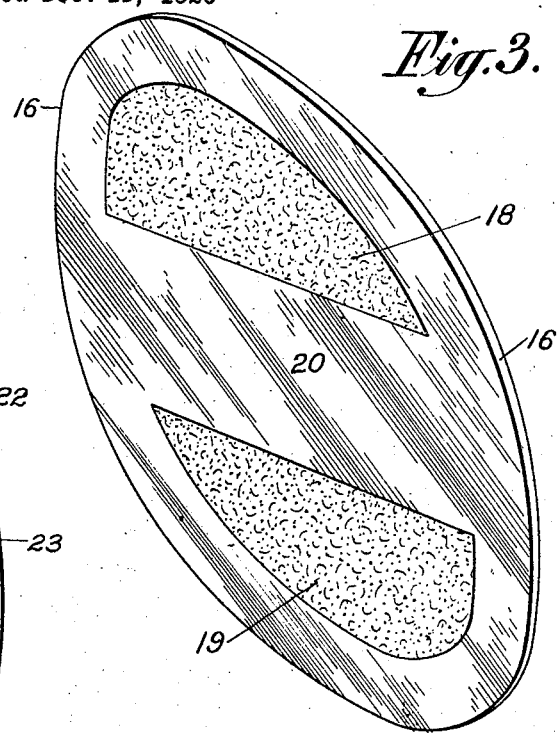
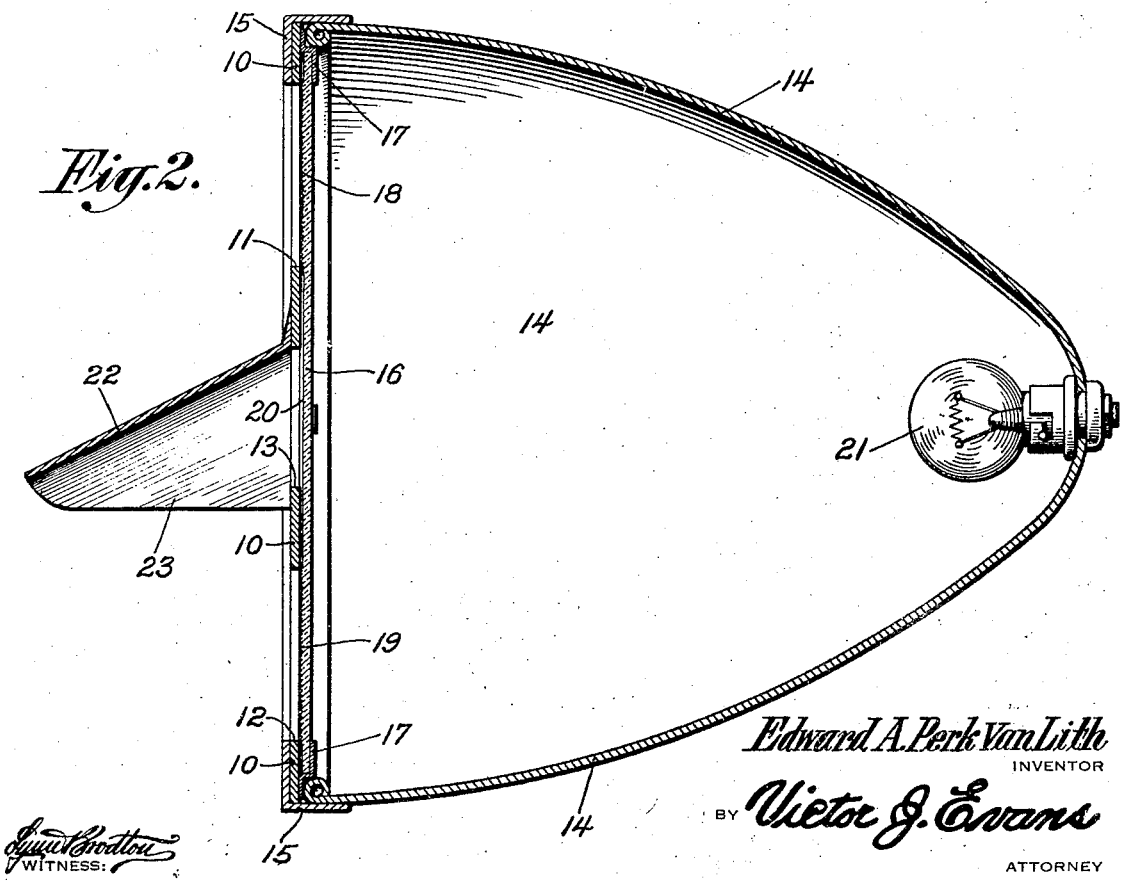
Edward A. Perk Van Lith
INVENTOR
BY Victor J. Evans
ATTORNEY Patented Sept. 4, 1928.

1,683,503

UNITED STATES PATENT OFFICE.

EDWARD ADRIEN PERK van LITH, OF HOLYOKE, MASSACHUSETTS.

HEADLIGHT CLOSURE FOR MOTOR VEHICLES.

Application filed December 13, 1926, Serial No. 154,578. Renewed July 25, 1928.

This invention relates to improvements in headlight closure for motor vehicles.

The primary object of the invention resides in a closure for automobile headlights for eliminating the glare from the eyes of a driver or an approaching vehicle or of a pedestrian, but which affords ample illumination of the road while driving in the dark.

Another object of the invention is to provide a closure which includes an upper and lower translucent field for producing a beam of light without a glare, and a clear field interposed between said translucent fields for producing a bright beam but which beam is reflected downward and forward upon the roadway by reason of a shield mounted thereover.

A further object of the invention is the provision of an anti-glare closure which may be substituted for the present style of lens without changing the construction of the headlight.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of my improved headlight lens in its entirety.

Figure 2 is a vertical sectional view therethrough showing the lens in position upon a headlight.

Figure 3 is a detail perspective view of the glass plate per se.

Referring more particularly to the drawing, the reference numeral 10 designates a metal plate or disk having semi-circular shaped cut-out openings 11 and 12 therein, and between which an elongated cut-out opening 13 is provided. The diameter of the plate 10 is such as to fit in the front of the headlight 14 and is held therein by the usual retaining ring 15. A glass plate 16 is supported on the rear side of the plate 10 by lugs or clips 17 and which glass plate has an upper frosted or translucent field 18 in register with the opening 11 and a lower frosted or translucent field 19 in register with the cut-out opening 12. The clear portion 20 is provided intermediate the translucent fields for register with the cut-out opening 13 and which clear field is disposed approximately in horizontal alignment with the electric light bulb 21 of the headlight 14.

For reflecting the rays of light which penetrates the clear field, I provide the outer side of the plate 10 with a shield 22, the front edge of which terminates approximately on a horizontal plane with the bottom of the clear field so as to prevent upward spreading of the light beam and for reflecting the light beam downward and forward upon the roadway. The ends of the shield are curved downward as at 23 to prevent the rays of light from being projected from opposite sides of the headlight.

From the foregoing description, it will be seen that I have provided a closure which may be mounted in an automobile headlight and which will prevent the glare of light therefrom but which produces a beam of light sufficient for lighting up the roadway forward of the vehicle. A driver of an approaching vehicle may gaze into the headlight equipped with the closure of the class described and will see a full round light but the beam of light from the clear field is restricted to the roadway due to the shield which prevents the glare from interfering with the vision of the approaching driver.

What is claimed as new is:—

A headlight closure comprising a plate having upper and lower cut-out openings therein and an intermediate cut-out opening, a glass plate supported by the back of said plate and having a clear field in register with said intermediate cut-out opening and translucent fields in register respectively with said upper and lower cut-out openings, and a shield mounted on the front of said plate and disposed over and forward of said intermediate cut-out opening and terminating on a horizontal plane with the bottom edge of said clear field.

In testimony whereof I hereby affix my signature.

EDWARD ADRIEN PERK van LITH.